United States Patent
Klenk et al.

[11] Patent Number: 6,155,105
[45] Date of Patent: Dec. 5, 2000

[54] METHOD FOR DETECTING RPM ESPECIALLY FOR DETECTING COMBUSTION MISFIRES

[75] Inventors: Martin Klenk, Backnang, Germany; Michael Lehner, Mühlacker, Germany; Andrea Lohmann, Stuttgart, Germany

[73] Assignee: Robert Bosch GmbH, Stuttgart, Germany

[21] Appl. No.: 09/283,239

[22] Filed: Apr. 1, 1999

[30] Foreign Application Priority Data

Apr. 2, 1998 [DE] Germany ............... 198 14 732

[51] Int. Cl.[7] .............................. G01M 15/00
[52] U.S. Cl. ............................ 73/117.3; 340/441
[58] Field of Search ................. 73/116, 117.2, 73/117.3; 340/438, 441; 701/70, 110, 111

[56] References Cited

U.S. PATENT DOCUMENTS

| | | | |
|---|---|---|---|
| 5,265,575 | 11/1993 | Norota . | |
| 5,428,991 | 7/1995 | Klenk et al. . | |
| 5,452,604 | 9/1995 | Namiki et al. ......................... | 73/117.3 |
| 5,670,713 | 9/1997 | Machida et al. ....................... | 73/117.3 |
| 5,696,316 | 12/1997 | Mezger et al. . | |
| 5,808,186 | 9/1998 | Matsumoto et al. ................... | 73/117.3 |
| 5,822,710 | 10/1998 | Mezger et al. . | |
| 5,955,663 | 9/1999 | Ries-Muller et al. ................ | 73/117.3 |

FOREIGN PATENT DOCUMENTS 4138765 7/1992 Germany .

*Primary Examiner*—Eric S. McCall
*Attorney, Agent, or Firm*—Walter Ottesen

[57] ABSTRACT

The invention is directed to a method for high-resolution rpm detection in a multicylinder internal combustion engine having a crankshaft. Segment times (ts) are detected in which the crankshaft of the engine passes through predetermined angular regions. First corrective values are formed during overrun operation and logically coupled to the segment times (ts) so that deviations of the segment times (ts) of different segments are compensated in the overrun operation. Second corrective values outside of the overrun operation are determined on the basis of the corrected segment times and logically coupled to at least one of the corrected segment times and further processed segment times so that the deviations of the corrected segment times or the further processed segment times are compensated with each other during misfire-free operation.

2 Claims, 2 Drawing Sheets

000
METHOD FOR DETECTING RPM ESPECIALLY FOR DETECTING COMBUSTION MISFIRES

FIELD OF THE INVENTION

The invention relates to a method for the high-resolution detection of rpm of a multicylinder internal combustion engine on the basis of times in which the crankshaft of the engine passes through predetermined angular regions. The times are identified in the following also as segment times.

The knowledge of the precise, that is, highly-resolved rpm is especially helpful for the detection of combustion misfires.

BACKGROUND OF THE INVENTION

Combustion misfires lead to an increase of the toxic substances which are emitted during the operation of the engine and can furthermore lead to damage of a catalytic converter in the exhaust system of the engine. A detection of combustion misfires in the total rpm and load ranges is necessary to satisfy statutory requirements for the on-board monitoring of exhaust-gas relevant functions. In this context, it is known that characteristic changes of the rpm trace of the engine occur during operation with combustion misfires compared to normal operation without misfires. Normal operation without misfires can be distinguished from operation with misfires from the comparison of the rpm traces.

A method operating on this basis is already disclosed in German patent publication 4,138,765, corresponding to U.S. patent application Ser. No. 07/818,884, filed Jan. 10, 1992, now abandoned.

In accordance with this known method, a crankshaft angle region identified as a segment is assigned to a specific region of the piston movement of each cylinder. The segments are realized, for example, by markings on a transducer wheel coupled to the crankshaft. The segment time in which the crankshaft passes through this angle region is dependent, inter alia, from the energy converted in the combustion stroke. Misfires lead to an increase of the segment times which are detected in synchronism with the ignition. According to the known method, an index for the rough running of the engine is computed from the differences of the segment times. Additional slow dynamic operations, such as the increase of the engine rpm during vehicle acceleration, are mathematically compensated. A rough-running value, which is computed in this way for each ignition, is likewise compared ignition synchronously to a predetermined threshold value. This threshold value is, if required, dependent upon operating parameters such as load and rpm and exceeding this threshold is evaluated as a misfire.

The reliability of the method is decisively dependent upon the determination of the segment times and therefore on the accuracy with which the markings can be produced on the transducer wheel during manufacture. Additional sources of error result from the position of the transducer wheel, that is, because of the eccentricity of its arrangement on the crankshaft as well as from the spacing between the transducer wheel and the inductive pickup. These mechanical imprecisions can be mathematically eliminated by an adaptation method carried out during overrun operation of the engine. Such a method is disclosed, for example, in U.S. Pat. Nos. 5,428,991 and 5,696,316. Segment times can be determined in normal operation outside of overrun operation and be logically coupled to the corrective values. Deviations of these segment times are therefore independent of manufacturing inaccuracies of the transducer wheel and point to other causes such as torsion oscillations of the crankshaft.

Torsion oscillations are superposed on the rotational movement of the crankshaft. The torsion oscillations occur primarily at high rpms during fired operation and lead to a systematic lengthening or shortening of the segment times of individual cylinders so that, for example, the detection of misfires is made more difficult. For this reason and for the reason of differences particular to each cylinder because of wear or manufacturing inaccuracies, a base noise in the form of a scattering width of the segment times remains even after the transducer wheel adaptation and this basic noise is not attributable to misfires. Actual misfires can be distinguished from this base noise with greater difficulty the less individual misfires operate on the rpm of the crankshaft. The reliability of the misfire detection therefore drops with increasing number of cylinders of the engine and with increasing rpm as well as decreasing load.

A method is disclosed in U.S. patent application Ser. No. 08/658,507, filed Jun. 10, 1996, wherein the determination of the corrective values takes place during fired operation, that is, during normal operation outside of overrun operation.

This method can always be advantageously utilized (also separately from the misfire detection) when a high-resolution detection of rpm is needed.

SUMMARY OF THE INVENTION

The object of the invention is to further improve the high-resolution detection of rpm with respect to speed, reliability and precision of the formation of the corrective value.

The method of the invention is for high-resolution rpm detection in a multicylinder internal combustion engine having a crankshaft. The method includes the steps of: detecting segment times (ts) in which the crankshaft of the engine passes through predetermined angular regions; forming first corrective values during overrun operation and logically coupling the first corrective values to the segment times (ts) so that deviations of the segment times (ts) of different segments are compensated in the overrun operation; and, determining second corrective values outside of the overrun operation on the basis of the corrected segment times and logically coupling the second corrective values with at least one of the corrected segment times and further processed segment times so that the deviations of the corrected segment times or the further processed segment times are compensated with each other during misfire-free operation.

The basic idea of the invention is that the two learning methods are so combined that initially, in a first step, a segment time correction takes place on the basis of corrective values learned during overrun operation and that rough-running values are formed on the basis of the corrected segment times and that, thereafter, in a second method step, a correction of the rough-running value takes place to compensate the non-uniformities occurring during fired operation.

The method will now be reviewed in detail:

a) segment times are corrected with corrective values learned during overrun operation as disclosed, for example, in U.S. Pat. Nos. 5,428,991 and 5,696,316, incorporated herein by reference, that is, a correction of transducer wheel errors takes place in a first adaptation step in dependence upon rpm or independently of rpm;

b) thereafter, rough-running values (lut) and, if needed, filtered rough-running values (flut) are computed on the basis of these corrected segment times;

c) the values obtained above are used further to compute corrective values for the correction of rough-running values under load during fired operation and for further processing to compute misfire detection algorithms with the corrected rough-running values. This corresponds to a second adaptation step building upon the result of the first adaptation step.

From this procedure, the following advantages are obtained. In contrast to the fuel-on-adaptation method known up to now (adaptation under load during fired operation), the reliability against defective learning is increased. The possibility of a defective learning results from the fact that the presence of normal operation (of operation without combustion misfires) is a condition precedent of a correct fuel-on-adaptation. If, instead, misfire operation is present, the danger exists that misfires influence the determination of the corrective values. The invention reduces this potential fault by learning the transducer wheel errors in overrun operation. Since the errors of the transducer wheel define the largest portion of error, a satisfactory precision is reached already in the first stage. In overrun operation, it cannot happen that values are learned erroneously which are influenced by misfires.

In the correction of the rough-running values in the second adaptation stage which follows, only the differences particular to a cylinder are considered which are not based on influences of the transducer wheel. A correction is possible which is more precise in comparison to the fuel-on-adaptation known to date via the smaller value range of the corrective factors formed in the second adaptation stage.

The adaptation can furthermore reach steady state more rapidly because the value range of the corrective values is narrower compared to the fuel-on-adaptation known to date. In the adaptation of the transducer wheel errors in overrun operation, more rapid filters can be used, if required, because the risk of defective learning in overrun operation is less than in normal operation. The sequential execution of both adaptations (overrun operation, normal operation) permits a decoupling of the result of the transducer wheel adaptation for a cylinder equalization function. The object of a cylinder equalization is to equalize the torque contribution of the individual cylinders, for example, via an intervention in the fuel quantity, which is metered to the individual cylinders, in an engine having direct injection.

This decoupling is based on the following. Transducer wheel influences make a physical non-uniformity of the rotation appear which is not present. The transducer wheel influences should therefore not affect the misfire detection and should not be considered with respect to cylinder equalization.

Torsion oscillations and torque contributions, which are different for each cylinder, are, in contrast, associated with a physical non-uniformity of the rotation.

These oscillations and torque contributions should likewise not influence the misfire detection and should therefore be compensated in the rough-running signal for the misfire detection. On the other hand, the oscillations and torque contribution should be considered as real physical fluctuations for the cylinder equalization. Stated otherwise, the result of the fuel-on-adaptation, which is optimized for the misfire detection, is suitable for cylinder equalization only to a limited extent because it compensates the disturbances in the signal processing and therefore counters a real physical reaction to the disturbances.

The subdivision of the learning process in accordance with the invention makes possible a parallel optimization of the misfire detection by retaining the fuel-on-adaptation and a cylinder equalization function which is based on the transducer wheel adaptation in overrun operation without being negatively affected by the action of the fuel-on-adaptation.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
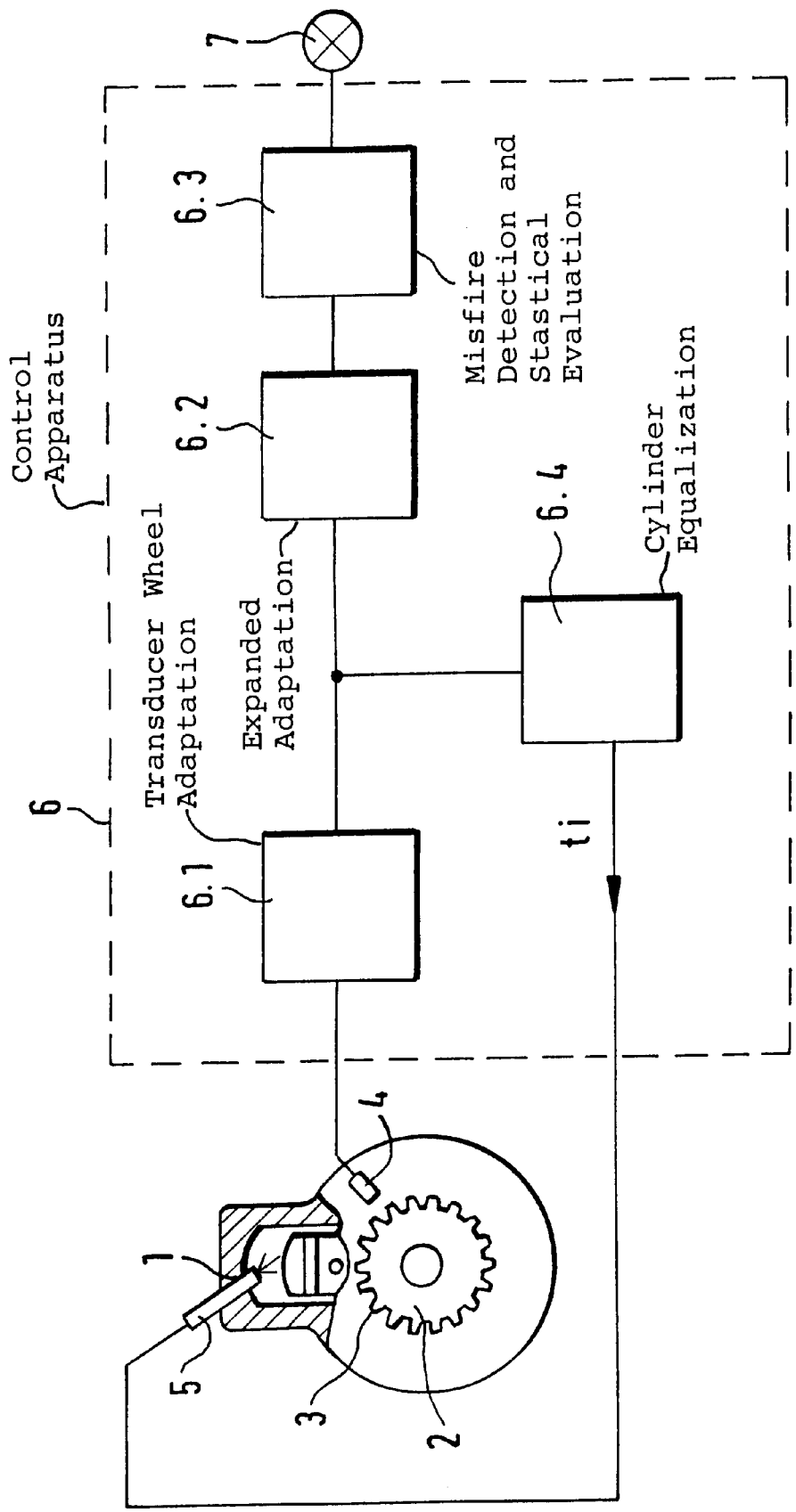
FIG. 1 is a function block diagram illustrating the method according to the invention.

FIG. 1 shows an internal combustion engine 1 having an angle transducer wheel 2 carrying markings 3 as well as an angle sensor 4, a fuel-injection valve 5, a control apparatus 6 and a fault lamp 7. The angle transducer wheel is coupled to the crankshaft of the engine and the rotational movement of the angle transducer wheel is converted into an electrical signal with the aid of the angle sensor 4 realized as an inductive sensor. The periodicity of the electrical signal defines an image of the periodic passing of the markings 3 at the angle sensor 4. The time duration between an increase and a drop of the signal level therefore corresponds to the time in which the crankshaft has rotated further over an angular region corresponding to the extent of a marking. These time durations are further processed in the control apparatus 6 to an index Lut for the rough running of the engine. The control apparatus 6 is realized as a computer. One example of a Lut computation will be shown hereinafter.

FIG. 1 furthermore shows a block 6.1 which represents the transducer wheel adaptation and a block 6.2 which shows the expanded adaptation in fired operation. Block 6.3 defines the function of the misfire detection and the statistical evaluation and block 6.4 represents the further control apparatus functions and especially a function for cylinder equalization.

The function of block 6.1 will now be explained. For the transducer wheel adaptation, z/2 segment times are formed in overrun operation per crankshaft revolution in a four-stroke engine having z cylinders. One of the, for example, three segment times (for z=6, for example) is viewed as a reference segment. The deviations of the segment times of the two remaining segments are determined with respect to the segment time of the reference segment. Corrective values are so formed from the deviations that the segment times are the same with respect to each other. The segment times are logically coupled to the corrective values and the segment times are detected in overrun operation. For further details, reference can be made to U.S. Pat. Nos. 5,428,991 and 5,696,316 which are both incorporated herein by reference.

Block 6.2 represents the adaptation in fired operation, that is, the formation of corrective values in the context of an expanded adaptation in the fuel-on operation. The function here can be explained as follows. For multicylinder internal combustion engines, an index for the rough running of the engine is formed individually for each cylinder on the basis of segment times. An example for the formation of a rough-running value is explained below. Additionally, corrective values individual to a cylinder are formed during misfire-free operation from rough-running values individual to a cylinder in such a manner that the cylinder-individual rough-running values, which are logically coupled to the corrective values, become equal with respect to each other.

For the above purpose, mean values of the corrective rough-running values can, for example, be formed and deviations of individual corrected rough-running values from the mean value are formed and are processed to new corrective values by additive logic coupling of the deviation to the old corrective values. Details of the above are disclosed, for example, in U.S. Pat. No. 5,822,710 which is incorporated herein by reference.

Block 6.3 represents a misfire detection. This misfire detection can be realized, for example, by a comparison of the rough-running values of block 6.2 or the segment times of block 6.1 to a threshold value which is dependent, as required, on operating parameters such as load or rpm. If the rough-running value or the segment time exceeds the threshold value, then this is evaluated as a misfire which is indicated by the fault lamp 7. The indication does not take place for every individual misfire but, for example, when the rate of the misfires exceeds a further threshold value.

The outcoupling of the signal between the two adaptation stages of blocks 6.1 and 6.2 is essential for the invention for the use in further functions in block 6.4. Block 6.4 defines especially a cylinder equalization function. This function operates, for example, such that the output signals of block 6.1 so influence the cylinder-individual fuel-metering signals ti that the torque contribution differences of the individual cylinders are reduced. The output signals of the block 6.1 are cleaned up with respect to transducer wheel inaccuracies.

Figure 2:
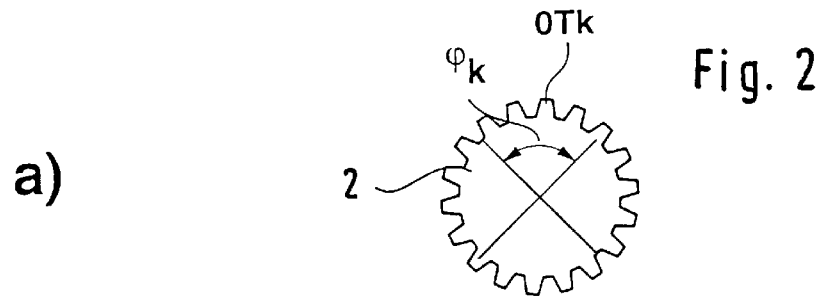
FIG. 2 explains the known principle for the formation of segment times as a basis of an index for the rough running on the basis of rpm measurements; and, FIG. 3 shows the influence of the torsion oscillations on the determination of the rough-running values.
Figure 2:
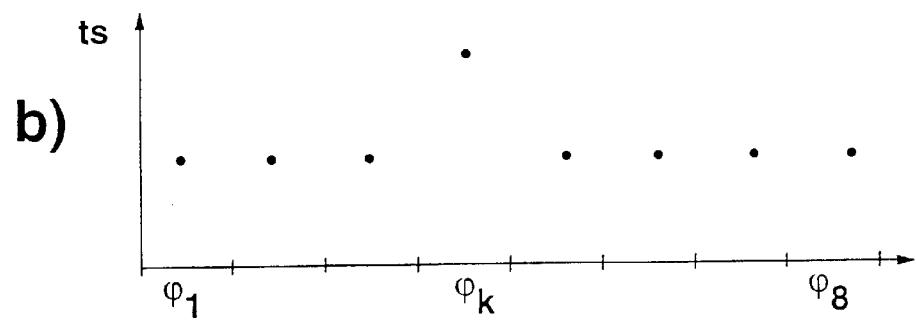
Figure 2:
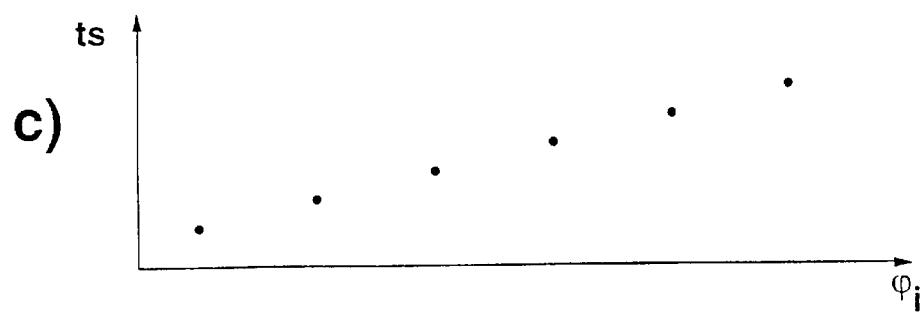

FIG. 2a shows a sectioning of the angle transducer wheel into four segments. Each segment has a predetermined number of markings. The marking 0Tk is assigned to that top dead center point of the piston movement of the k-th cylinder of an internal combustion engine which lies in the combustion stroke of this cylinder. In this example, the engine is an eight-cylinder engine. About this point, a rotational angle region $\phi k$ is defined which extends, in this example, over a quarter of the markings of the angle transducer wheel. In the same manner, angle regions $\phi 1$ to $\phi 8$ are assigned to the combustion strokes of the remaining cylinders. Here, a four-stroke principle is assumed wherein the crankshaft rotates twice for a complete work cycle. For this reason, the region $\phi 1$ of the first cylinder corresponds to the region $\phi 5$ of the fifth cylinder, et cetera. The angle regions corresponding to a crankshaft revolution can be separated from each other or they can be mutually contiguous or they may overlap. In the first case, markings are provided which are not assigned to any angle region. In the second case, each marking belongs precisely to an angle region and, in the third case, the same markings can be assigned to respectively different angular regions. In this way, any desired lengths and positions of the angle regions are possible.

In FIG. 2b, the times ts are plotted in which the angle regions are passed over by the rotational movement of the crankshaft. Here, a misfire is assumed in cylinder k. The loss of torque, which is connected to this misfire, leads to an increase of the time span ts corresponding thereto. The time spans ts define thereby already an index for the rough running which is, in principle, suitable for detecting misfires. The rough-running value receives the dimension of an acceleration by a suitable processing of the time span ts and especially by the formation of differences of mutually adjacent time spans and the normalization of these differences to the third power of the time span tsi at an ignition stroke having the index i. This rough-running value exhibits an improved signal/noise ratio as has been shown empirically.

FIG. 2c makes clear the influence of the rpm changes on the detection of the time durations ts. The case of an rpm reduction is shown here as it typically occurs in overrun operation of a motor vehicle. This effect manifests itself in a comparatively uniform lengthening of the detected times ts. To compensate this effect, it is, for example, known to form a corrective term D for dynamic compensation and to so consider this term that the lengthening effect is compensated when computing the rough-running value.

A rough-running value corrected in this manner for the ignition stroke i of an eight-cylinder engine can, for example, be computed according to the following rule:

$Lut(i) =$ base term $B$ − corrective term $K$ for dynamic compensation $$= \frac{ts(i+1) - ts(i)}{ts(i)^3} - \frac{((ts(i+5) - ts(i-3)/8)}{ts(i)^3}$$

Generalized to z cylinders the corresponding formula is as follows:

$$Lut(i) = B - K = \frac{ts(i+1) - ts(i)}{(ts(i))^3} - \frac{ts(i + (\frac{z}{2}+1)) - ts(i - (\frac{z}{2}+1))}{(ts(i))^3}$$

wherein (z) number of cylinders of the engine.

Figure 3:
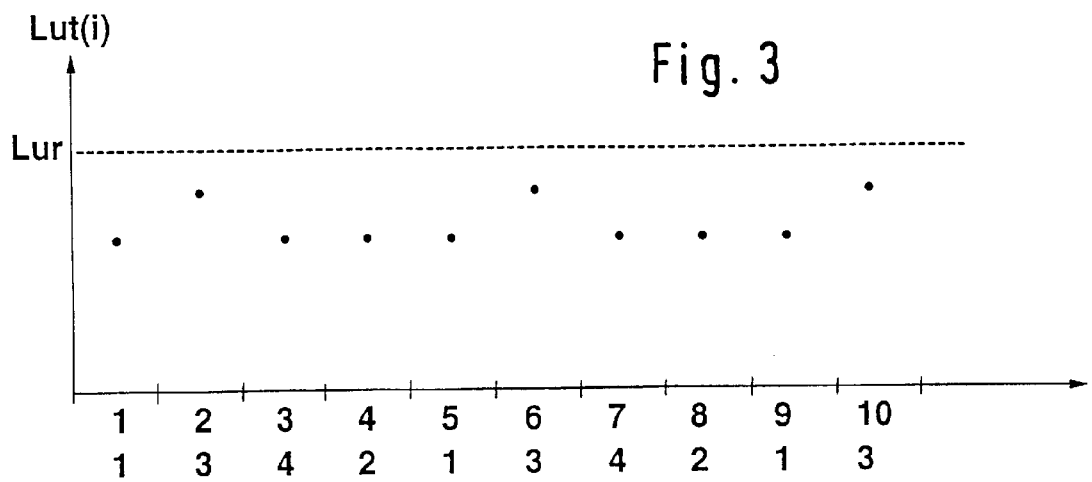

FIG. 3 shows rough-running values which can be computed in accordance with the above rule for different ignition strokes i=1 to 10 of a four-cylinder engine. Here, an increase of the segment time occurs systematically for the cylinder having the number 3. For the case shown, this segment time is brought very close to the rough-running threshold value. This increase can, for example, be caused by a torsion oscillation. Torsion oscillations occur primarily at high rpms and lead to a systematic lengthening or shortening of the segment times of individual cylinders so that the misfire detection is made more difficult.

According to the method of the invention, this effect, which reduces the disturbance spacing for the misfire detection, can be mathematically compensated for the misfire detection without the input signal being made incorrect in a cylinder equalization function.

It is understood that the foregoing description is that of the preferred embodiments of the invention and that various changes and modifications may be made thereto without departing from the spirit and scope of the invention as defined in the appended claims.

What is claimed is:

1. A method for high-resolution rpm detection in a multicylinder internal combustion engine having a crankshaft, the method comprising the steps of:

detecting segment times (ts) in which the crankshaft of said engine passes through predetermined angular regions;

forming first corrective values during overrun operation and logically coupling said first corrective values to said segment times (ts) so that deviations of said segment times (ts) of different segments are compensated in said overrun operation; and, determining second corrective values outside of said overrun operation on the basis of the corrected segment times and logically coupling said second corrective values with at least one of said corrected segment times and further processed segment times so that the deviations of the corrected segment times or said further processed segment times are compensated with each other during misfire-free operation.

2. The method of claim 1, wherein a cylinder equalization function operates on the basis of the segment times logically coupled to said first corrective values; and, a misfire detection function operates on the basis of the segment times, which are logically coupled to said first and second corrective values, or on the basis of processed segment times.

* * * * *